United States Patent [19]

Lile et al.

[11] Patent Number: 5,036,190

[45] Date of Patent: Jul. 30, 1991

[54] METHOD AND APPARATUS FOR CANDLING ENVELOPES

[75] Inventors: William R. Lile, Medford, N.J.; Russell M. Lange, Philadelphia, Pa.

[73] Assignee: Opex Corporation, Moorestown, N.J.

[21] Appl. No.: 475,350

[22] Filed: Feb. 5, 1990

[51] Int. Cl.[5] .............................................. G01N 9/04

[52] U.S. Cl. ................................ 250/223 R; 250/559; 53/396; 53/503

[58] Field of Search .................... 250/559, 209, 223 R, 250/214 R; 53/381 R; 307/311

[56] References Cited

U.S. PATENT DOCUMENTS 4,090,794 5/1978 Benini ............................ 250/223 R 4,124,968 11/1978 Stevens et al. .................... 53/381 R 4,139,977 2/1979 Russell .............................. 53/381 R 4,318,180 3/1982 Lundqvist et al. .................. 250/575

*Primary Examiner*—David C. Nelms

*Assistant Examiner*—K. Shami

*Attorney, Agent, or Firm*—Weiser & Stapler

[57] ABSTRACT

A candling system for a mail extraction device incorporates a light source in the form of a light emitting diode and a cooperating photo-transistor detector which operate in the infrared range, to increase the system's immunity to environmental variations, and a linearization circuit for increasing the differentials in voltage which are developed between adjacent density levels (relative to the number of sheets involved), to permit the system to better monitor (distinguish between) envelopes containing an increased number of documents with improved accuracy and efficiency.

22 Claims, 3 Drawing Sheets

METHOD AND APPARATUS FOR CANDLING ENVELOPES

BACKGROUND OF THE INVENTION

The present invention relates generally to the field of mail extraction, and in particular, to certain improvements in the so-called "candling" of envelopes in connection with their processing by a mail extraction device.

A variety of devices have been developed to facilitate the mail extraction process, in which large quantities of envelopes are automatically opened to gain access to their contents. One example of this is the "Rapid Extraction Desk" manufactured by Opex Corporation of Moorestown, N.J., an exemplary model of which is illustrated in U.S. Pat. No. 3,979,884 (Re 32,328).

In their overall operation, these machines are used to receive a series of envelopes which are first sequentially delivered to a device for severing (cutting open) one or more envelope edges, and which are then sequentially delivered to an extraction area for access by the machine's operator. At the extraction area, steps are taken to spread apart the opposing faces of the envelope, permitting the operator to gain access to the contents of each envelope for extraction. The emptied envelope is then released from the extraction area, and checked to make sure that the envelope has been emptied of all of its contents.

In operating these machines, it is often important to determine if documents are contained by the envelope as it passes through the mail extraction device. For example, it has for some time been common practice to sequence operations of the mail extraction device responsive to an extraction of documents from the envelope by the machine's operator. Such so-called "content activation" (as well as "differential activation") is particularly useful in increasing the efficiency of the mail extraction procedure by conveying envelopes to and from the extraction point at a rate which is suited to the operator, yet as rapid as possible. It has also for some time been common practice to check each envelope following the extraction procedure, to verify that all contents have been removed before the envelope is discarded.

Each of these functions are performed by what can generally be characterized as a "candling" operation, in which steps are taken to "look through" an envelope by monitoring changes in the envelope's ability to transmit light (either from an applied source or making use of ambient lighting). This is then used to initiate one or the other of the above-identified system functions, as desired.

It has for some time been known that the transmissivity of an envelope, and accordingly, the ability of conventionally available candling devices to identify (distinguish between) changes in light sufficient for detection purposes, decreases significantly as the number of sheets of paper (documents) to be candled increases. More specifically, and referring now to FIG. 1 of the drawings, the curve A shows that the developed signal will tend to degrade to an extent which makes it virtually impossible to effectively detect changes in light when more than three sheets of paper are involved. This has been found to present a significant limitation to the candling of envelopes in a mail extraction procedure.

This is further complicated by irregularities resulting from differences in ambient lighting, as well as differences in the characteristics of the envelopes which are being processed (e.g., differences in construction, color, paper density and/or thickness). Such irregularities can not only further limit the ability of the system to distinguish between, or even detect a relatively large number of documents contained within an envelope, but can also limit the ability of the mail extraction device to handle different types of envelopes in a single (unified) mail extraction procedure. This can at times compromise the overall effectiveness of the mail extraction device, in some cases requiring an additional, presorting operation.

It therefore remained desirable to improve the candling techniques used in connection with a mail extraction device to facilitate the extraction process, by overcoming the above-described limitations.

SUMMARY OF THE INVENTION

It is therefore the primary object of the present invention to provide an improved technique for candling envelopes in a mail extraction device.

It is also an object of the present invention to provide an improved technique for candling envelopes in a mail extraction device which is less subject to degradation due to the number of documents contained by an envelope.

It is also an object of the present invention to provide an improved technique for candling envelopes in a mail extraction device which is less subject to differences in ambient lighting and envelope characteristics, to better permit envelopes of different types to be effectively processed.

It is also an object of the present invention to provide an improved technique for candling envelopes in a mail extraction device which is adaptive to changes in ambient conditions, and the overall characteristics of the envelopes being processed.

It is also an object of the present invention to provide an improved technique for candling envelopes in a mail extraction device which provides the above-described improvements, and which is well suited to the mail extraction device with which it is associated.

These and other objects are achieved in accordance with the present invention by providing a candling system for a mail extraction device which incorporates a series of cooperating improvements, as follows.

Initial detection of envelope (contents) density is accomplished making use of a light source which takes the form of a light emitting diode and a cooperating photo-transistor detector which operate in the infrared range, in place of the ambient or white light sources which were previously utilized for this purpose. This operates to increase the system's immunity to environmental variations, particularly those resulting from changes in ambient lighting in the vicinity of the mail extraction device.

Detected signals are further subjected to a linearization procedure, which operates to better distinguish the measurements which are taken. Referring to curve B of FIG. 1, such linearization operates to increase the differentials in voltage which are developed between adjacent density readings (relative to the number of sheets involved), particularly those corresponding to an increased number of sheets (in excess of three). This then permits the system to better monitor (distinguish between) envelopes containing an increased number of documents, with improved accuracy and efficiency.

Such linearization is still further enhanced by an adaptive optimization of the density measuring circuit, to account for changes inherently occurring as part of the mail extraction process including changes in ambient lighting, as well as changes in the characteristics of the envelopes which are being processed.

For further detail regarding a preferred embodiment candling system produced in accordance with the present invention, reference is made to the detailed description which is provided below, taken in conjunction with the following illustrations.

BRIEF DESCRIPTION OF THE DRAWINGS

In the several views provided, like reference numbers denote similar structure.

DETAILED DESCRIPTION OF THE PREFERRED EMBODIMENT

Figure 2:
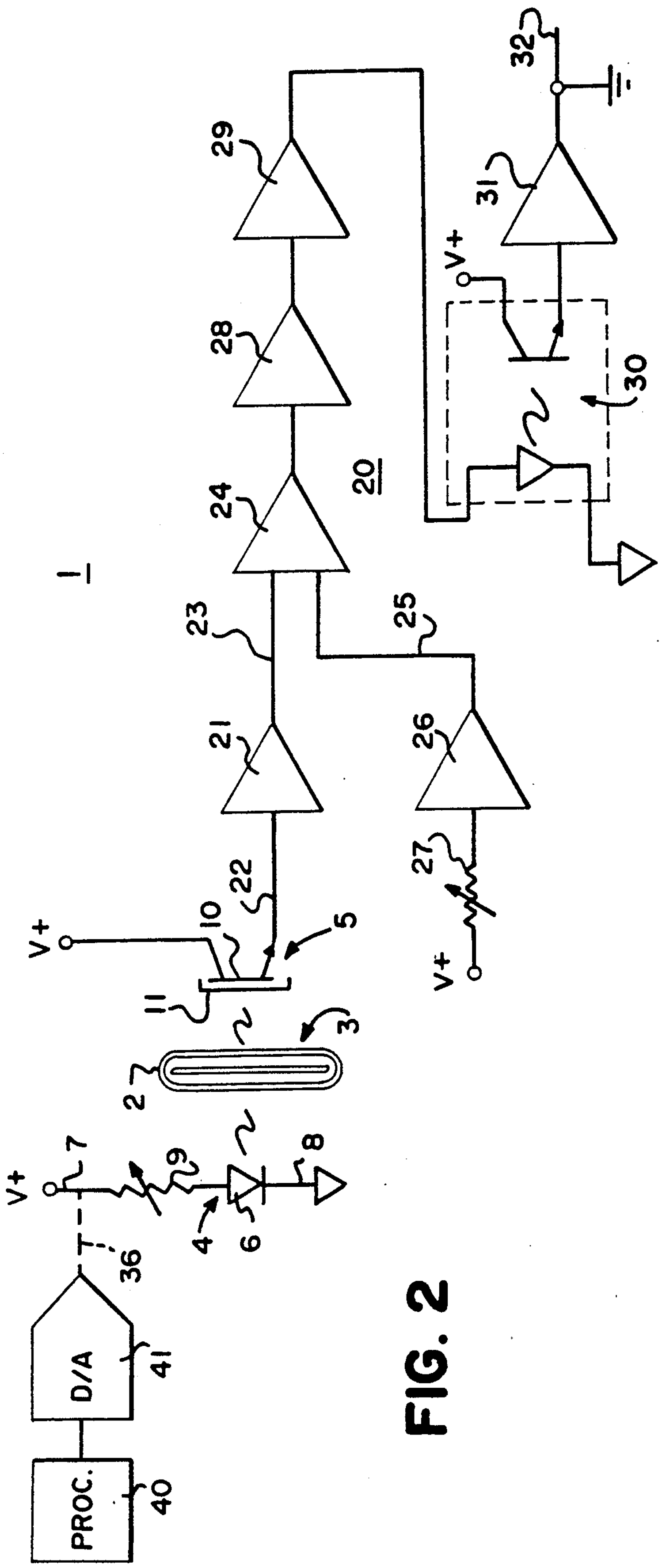
FIG. 2 is a schematic diagram showing a circuit for performing the linearization procedure which is graphically illustrated in FIG. 1.

FIG. 2 illustrates an apparatus 1 for implementing the improved candling techniques of the present invention. In operating the candling apparatus 1, an envelope 2 is conveyed to a selected location 3 at which the envelope 2 is positioned between a light source 4 and a cooperating receptor 5. This operative combination is then used to "look through" the envelope 2 by measuring the amount of light produced by the light source 4 which reaches the receptor 5, i.e., the transmissivity of the envelope. This could be used to determine the number of documents contained within the envelope 2. However, this is primarily used to determine whether or not contents have been removed from the envelope 2, for controlling subsequent operations of the associated mail extraction device (either the discarding of an envelope or a further cycling of the associated mail extraction device).

In accordance with the present invention, the light source 4 preferably takes the form of a light emitting diode 6 which operates in the infrared light emitting range, as distinguished from the white (visible) light sources which were previously used for this purpose. The light emitting diode 6 is connected between a voltage source 7 and ground, at 8, in series combination with a variable resistor 9 which is provided for adjustment (biasing) purposes. A corresponding receptor 5 is provided for receiving the infrared light produced by the light emitting diode 6, preferably in the form of a phototransistor 10 which is sensitive to infrared light.

It has been found that the use of a light emitting diode 6 and phototransistor 10 which operate in the infrared range benefits a candling procedure by minimizing the adverse affects of ambient lighting in the vicinity of the mail extraction device. This makes the candling apparatus 1 significantly more immune to variations in environment, providing a more uniform (as nearly constant as is possible) signal for further processing as will be described more fully below. Such immunity to the adverse affects of ambient lighting may be further enhanced by providing the phototransistor 10 with a filter 11 (spectral filter) for better matching the output of the light emitting diode 6 to the corresponding phototransistor 10, or even covers or "blinders" for blocking stray ambient lighting.

Figure 1:
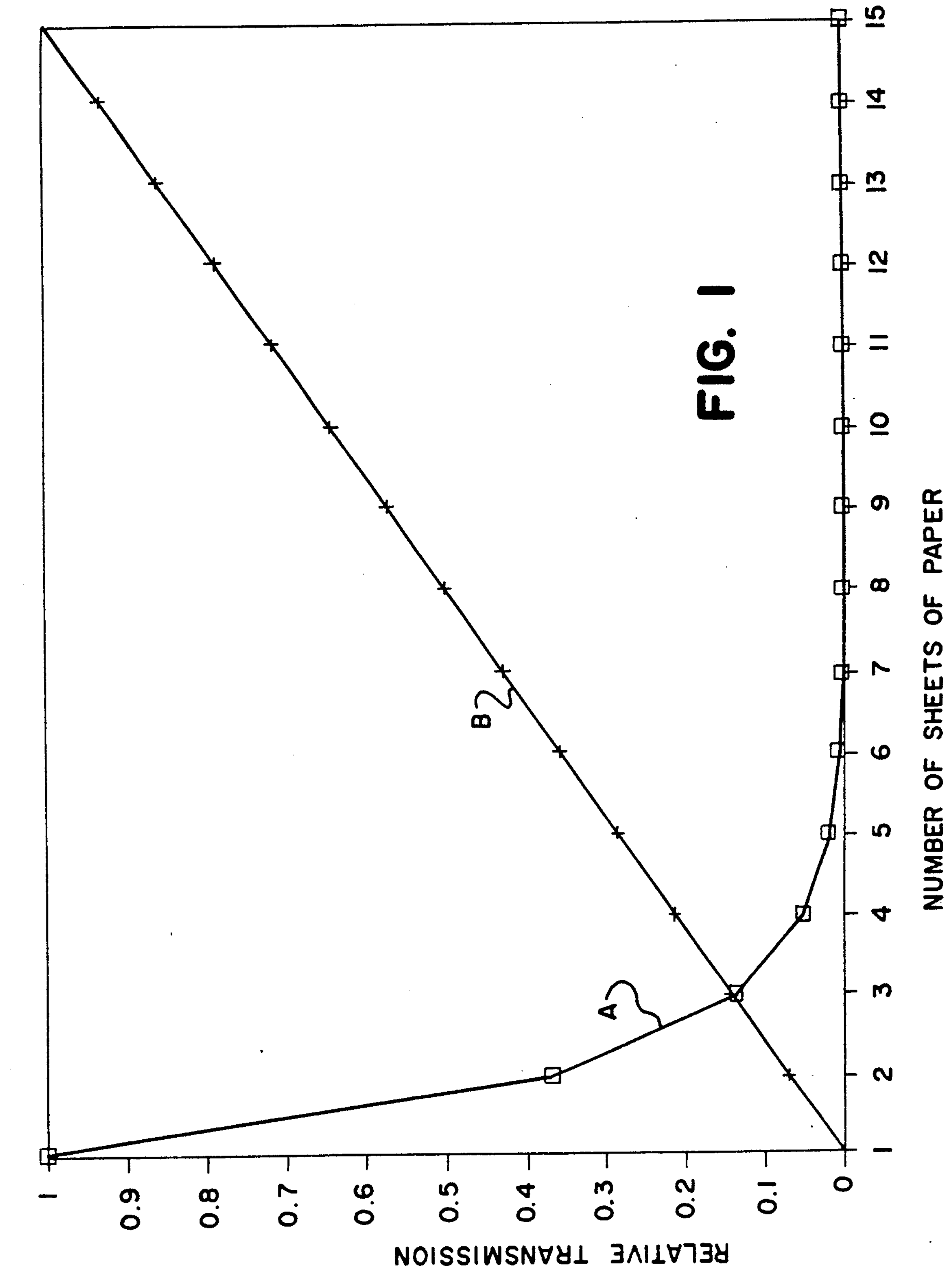
FIG. 1 is a graph demonstrating the transmission of light through an envelope relative to the number of documents which that envelope contains, both before and after the linearization procedure of the present invention.

Despite their improved immunity to ambient conditions, the light source 4 and receptor 5 will nevertheless combine to develop signals having characteristics on the order of those illustrated in the curve A of FIG. 1. Thus, again, the non-linearity of this curve would tend to make it difficult to effectively distinguish between numbers of sheets of paper in excess of three sheets, since the differential between levels for adjacent numbers of sheets would be too small for effective detection by the circuitry which follows. For this reason, and further in accordance with the present invention, steps are taken to linearize the detected signal to develop an output on the order of that illustrated in the curve B of FIG. 1. As a result, following this linearization step the difference in transmissivity detected for different numbers of sheets of paper, particularly for groupings in excess of three sheets, will be significantly improved, enabling an effective differentiation of the detected signal levels then being developed by the light source 4 and receptor 5.

FIG. 2 further illustrates a linearization circuit 20 for producing the linearized curve B illustrated in FIG. 1. As shown, signals received from the phototransistor 10 are delivered to a logarithmic circuit 21, at 22, which electronically operates to develop the logarithm of the signal applied at 22. This logarithmic signal, developed at 23, is then applied to a first input of a differential amplifier 24. The second input of the differential amplifier 24 receives a reference or balancing input from an amplifier 26 having an input which is connected to the source voltage (V+) by a variable resistor 27. The variable resistor 27 is used to adjust or equalize the current supplied to the differential amplifier 24 by the phototransistor 10, so that the output of the differential amplifier 24 will constitute only changes in density detected as the envelope 2 passes through the candling apparatus 1 (by developing a base-line operating condition for the differential amplifier 24 which is fixed at zero). The output of the differential amplifier 24 is then amplified, at 28.

Following amplification, the output of the differential amplifier 24 is subjected to isolation, for purposes of noise immunity. In the linearization circuit 20 of FIG. 2, this is accomplished through opto-isolation, which is current dependent. Thus, to this end, the amplified output of the differential amplifier 24 is first converted from a voltage-dependent signal to a current-dependent signal by the converter circuit 29. This developed current is then applied to an opto-isolator 30, followed by a conversion from a current-dependent signal back to a voltage-dependent signal by the converter circuit 31.

This then develops a voltage-dependent output, at 32, which is well suited to conventional processing by the existing signal processor of the candling system, in otherwise known fashion. However, resulting from the improvements of the present invention, the output signal 32 will exhibit significantly enhanced differentials in voltage responsive to the number of documents contained by a particular envelope. This is particularly so in connection with those envelopes containing three or more documents. This has the significant advantage of permitting a more accurate determination as to whether or not a particular envelope has been emptied of contents, including the relatively dense envelopes which had previously presented a particular difficulty in this regard.

Figure 3:
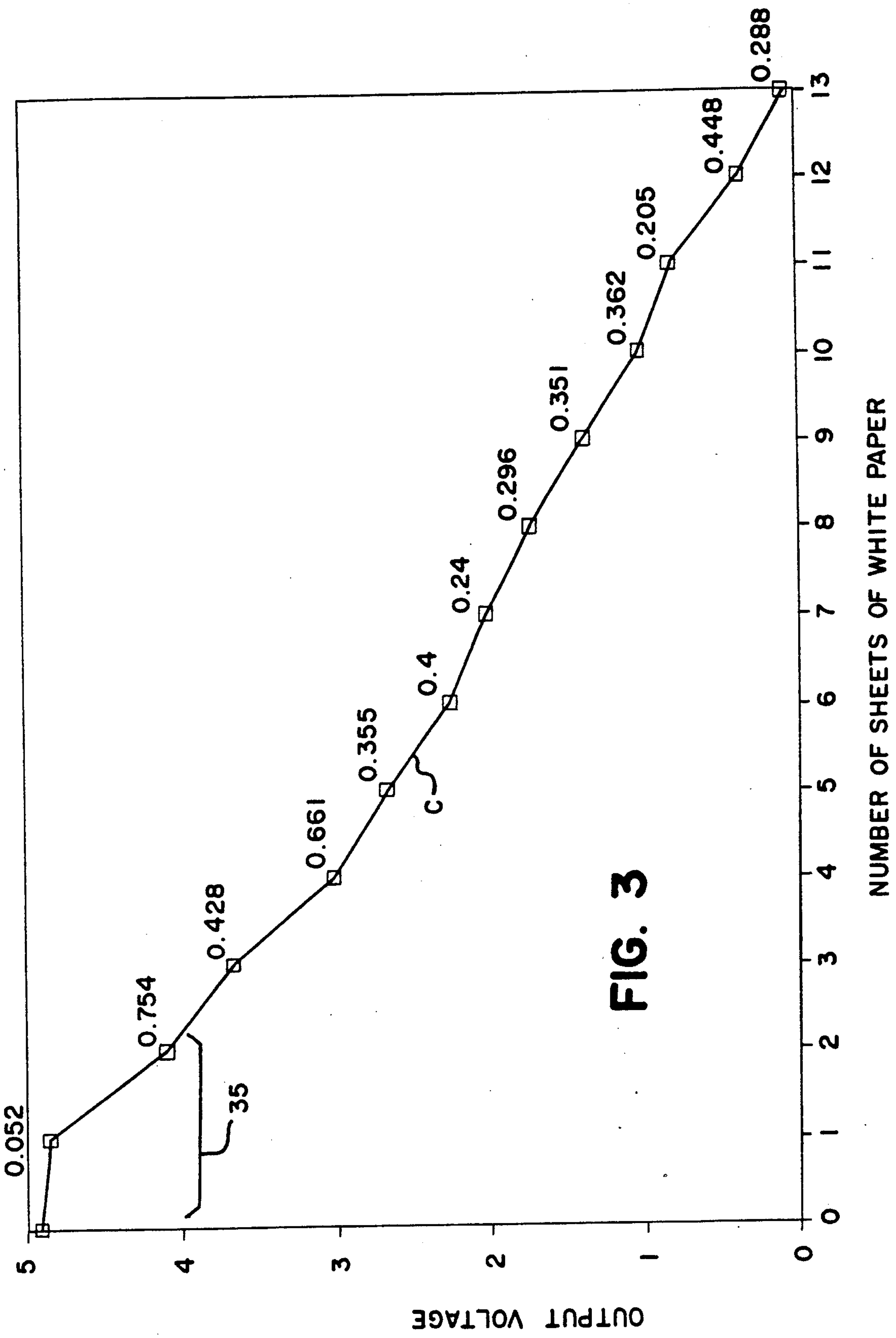
FIG. 3 is a graph showing actual voltage levels produced for subsequent processing, making use of the linearization techniques of the present invention.

In achieving the improvements of the present invention, it is preferable for the voltage difference between adjacent density levels to be as nearly constant as is possible, irrespective of the number of documents which might be contained by a particular envelope. This operates to facilitate a proper determination of the condition of a particular envelope (and its contents), irrespective of differences in envelope density (resulting from differences in envelope type). FIG. 3 illustrates an output curve C which demonstrates the results which can be achieved making use of the candling apparatus 1 of the present invention. The enhanced linearity of the output curve C has been found to be quite effective in ensuring an effective determination of the condition of a particular envelope.

It should be noted here that the curve C illustrated in FIG. 3 of the drawings exhibits a negative slope, as distinguished from the positive slope of the curve B of FIG. 1. This is only because of the design of the circuit which was used to take the measurements illustrated. Whether the output curve is positive or negative in slope is not significant in achieving the improvements of the present invention. Rather, this results only from the specific configuration of the linearization circuit which has been implemented.

Although the above-described circuitry serves well to provide the improvements which are sought in accordance with the present invention, it is possible to still further reduce non-linearities in conjunction with operations of the candling apparatus 1 by providing for an adaptive optimization of the density measuring circuitry previously described. Such non-linearities tend to arise from remaining effects of ambient lighting (beyond those accounted for by the light emitting diode 6 and phototransistor 10), as is best shown in referring to the upper voltage level region 35 of FIG. 3, as well as variations in the characteristics of the envelopes which are being processed.

To this end and further in accordance with the present invention, it has been found that such non-linearities can be still further reduced by regulating (varying) the current which is supplied to the light emitting diode 6. Such variation is readily accomplished by varying the diode supply voltage, at 36, in turn varying the current supplied to the light emitting diode 6. As a result, the emissions of the light emitting diode 6 may be increased or decreased responsive to changes in voltage at 36.

By increasing and decreasing this voltage responsive to then-present conditions, resulting either from changes in ambient lighting in the vicinity of the candling apparatus 1, or differences in the envelopes which are being processed for extraction, the linearization circuit 20 is caused to operate in a region (of the curve C, for example) which exhibits the greatest possible difference in voltage between adjacent points corresponding to the number of sheets of paper which might be contained by the envelope being monitored. This in turn restores the linearization circuit 20 to its maximum sensitivity responsive to the then-existing operating conditions of the mail extraction device with which the candling apparatus 1 is associated.

Preferably, this adaptive feature is implemented responsive to the measured opacity of a "sample" envelope, to then establish a voltage level at 36 for application to the light emitting diode 6. This is conveniently accomplished by coupling signals received from the processor 40 which conventionally forms part of the mail extraction device with a digital-to-analog converter 41 which replaces the fixed voltage source for the light emitting diode 6. The processor 40 may then be operated at the desired sampling rate to measure the level then detected by the candling apparatus 1, in otherwise ordinary fashion, and to then increase or decrease the voltage supplied to the light emitting diode 6 (and accordingly, its output) through operations of the digital-to-analog converter 41.

Generally speaking, this adaptive process need only be accomplished once for a given batch of envelopes, to account for then-existing ambient conditions. However, it would also be possible to increase the frequency of this adaptive process, if desired, by simply increasing the applied sampling rate. It would even be possible to sample the opacity of each encountered envelope, to continuously adjust the system in accordance with changes in the characteristics of the envelopes being processed. This would facilitate the processing of mixed envelope types by a single mail extraction device. However, such frequent samplings (and level adjustments) are presently believed to be unnecessary in achieving an effective result in accordance with the present invention. To be noted here is that if desired, a similar adaptive process may be used to establish the reference current supplied to the amplifier 26, by similarly varying the voltage applied to the variable resistor 27, providing still further adaptive adjustment of the candling apparatus 1 of the present invention.

To be noted is that certain operations associated with the candling apparatus 1 of the present invention are intended for microprocessor control. As a result of this, and to generally avoid interruptions in system operations, it is important to maintain continued operation of the microprocessor to the extent possible. For this reason, it is conventional to provide a battery back-up for such circuit elements, to account for interruptions of the main power source. However, the life of a battery is somewhat limited, requiring the batteries to be changed periodically. This in turn causes the very loss of power which the battery back-up is intended to prevent, requiring parameters of the system to nevertheless be restored in appropriate fashion.

Figure 4:
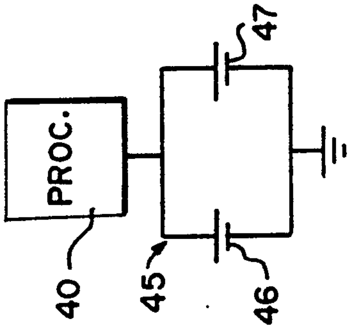
FIG. 4 is a schematic diagram showing a battery back-up circuit for use in conjunction with the system of the present invention.

In accordance with the present invention, it has been found that this disadvantage can be overcome by providing an improved battery back-up circuit 45 such as is illustrated in FIG. 4 of the drawings. As shown, the back-up circuit 45 includes a pair of batteries 46, 47 connected in parallel with one another and in series with the power supply. This then permits one of the batteries (e.g., the battery 46) to be changed while the other battery (e.g., the battery 47) operates to maintain power for operating the circuits involved throughout this battery-exchanging process, preserving the continuity which is desired.

It will be understood that various changes in the details, materials and arrangement of parts which have been herein described and illustrated in order to explain the nature of this invention may be made by those skilled in the art within the principle and scope of the invention as expressed in the following claims.

What is claimed is:

1. A method for candling envelopes to determine changes in contents of said envelopes, comprising the steps of:

illuminating at least portions of said envelopes with a light source;

receiving light passing through said envelopes, and any contents thereof, at a receptor for converting said received light to an electrical signal corresponding to measured levels of light, wherein said electrical signal is non-linear; and linearizing said electrical signal to equalize differences in said measured levels of light corresponding to contents of said envelopes comprised of selected numbers of sheets.

2. The method of claim 1 wherein said envelope portions are illuminated with light in the infrared range.

3. The method of claim 1 wherein said linearizing is logarithmic.

4. The method of claim 1 wherein said candling further comprises the step of adjusting said illuminating responsive to changing conditions associated with said candling.

5. The method of claim 4 wherein said changing conditions include changes in ambient lighting, and wherein said method further comprises the step of increasing and decreasing said illuminating responsive to increases and decreases in said ambient lighting.

6. The method of claim 4 wherein said changing conditions include changes in characteristics of said envelopes affecting the transmissivity of said envelopes, and wherein said method further comprises the step of increasing and decreasing said illuminating in inverse relation to increases and decreases in said transmissivity.

7. The method of claim 5 wherein said adjusting includes sampling characteristics of a sample of said envelopes to be processed, comparing characteristics of said envelopes to be processed with the sampled characteristics of the sample of said envelopes, and adjusting said illuminating responsive to said comparing of characteristics.

8. The method of claim 1 wherein said candling further comprises the step of adjusting said linearizing responsive to changing conditions associated with said candling.

9. An apparatus for candling envelopes to determine changes in contents of said envelopes, comprising:

means for illuminating at least portions of said envelopes;

means for receiving light produced by said illuminating means and passing through said envelopes, and any contents thereof, and for converting said received light to an electrical signal corresponding to measured levels of light, wherein said electrical signal is non-linear; and means for linearizing said electrical signal to equalize differences in said measured levels of light corresponding to contents of said envelopes comprised of selected numbers of sheets.

10. The apparatus of claim 9 wherein said illuminating means is a light emitting diode.

11. The apparatus of claim 10 wherein said light emitting diode emits light in the infrared range.

12. The apparatus of claim 11 wherein said receiving means is a phototransistor matched to said light emitting diode.

13. The apparatus of claim 12 wherein said phototransistor is matched to said light emitting diode by a spectral filter operative in the infrared range of said light emitting diode.

14. The apparatus of claim 9 which further comprises means for adjusting said illuminating responsive to changing conditions associated with said candling.

15. The apparatus of claim 14 wherein said adjusting means includes means for increasing and decreasing the light produced by said illuminating means responsive to said changing conditions.

16. The apparatus of claim 15 wherein said adjusting means increases and decreases said light responsive to increases and decreases in ambient lighting.

17. The apparatus of claim 15 wherein said adjusting means increases and decreases said light responsive to changes in characteristics of said envelopes affecting the transmissivity of said envelopes.

18. The apparatus of claim 14 wherein said adjusting means includes means for changing voltage levels applied to said illuminating means, to vary the light provided by said illuminating means.

19. The apparatus of claim 14 wherein said adjusting means includes means for sampling characteristics of a sample of said envelopes to be processed, means for comparing characteristics of said envelopes to be processed with the sampled characteristics of the sample of said envelopes, and means for adjusting said illuminating means responsive to said comparing means.

20. The apparatus of claim 9 wherein said linearizing means includes a logarithmic circuit for deriving the logarithm of said electrical signal.

21. The apparatus of claim 20 wherein said logarithmic circuit is balanced to provide a substantially zero base-line characteristic.

22. The apparatus of claim 21 which further comprises means for adjusting said balance responsive to changing conditions associated with said candling.

* * * * *